May 17, 1955
S. A. ELLER ET AL
2,708,432
WHEEL TRUING DEVICE
Original Filed July 6, 1949
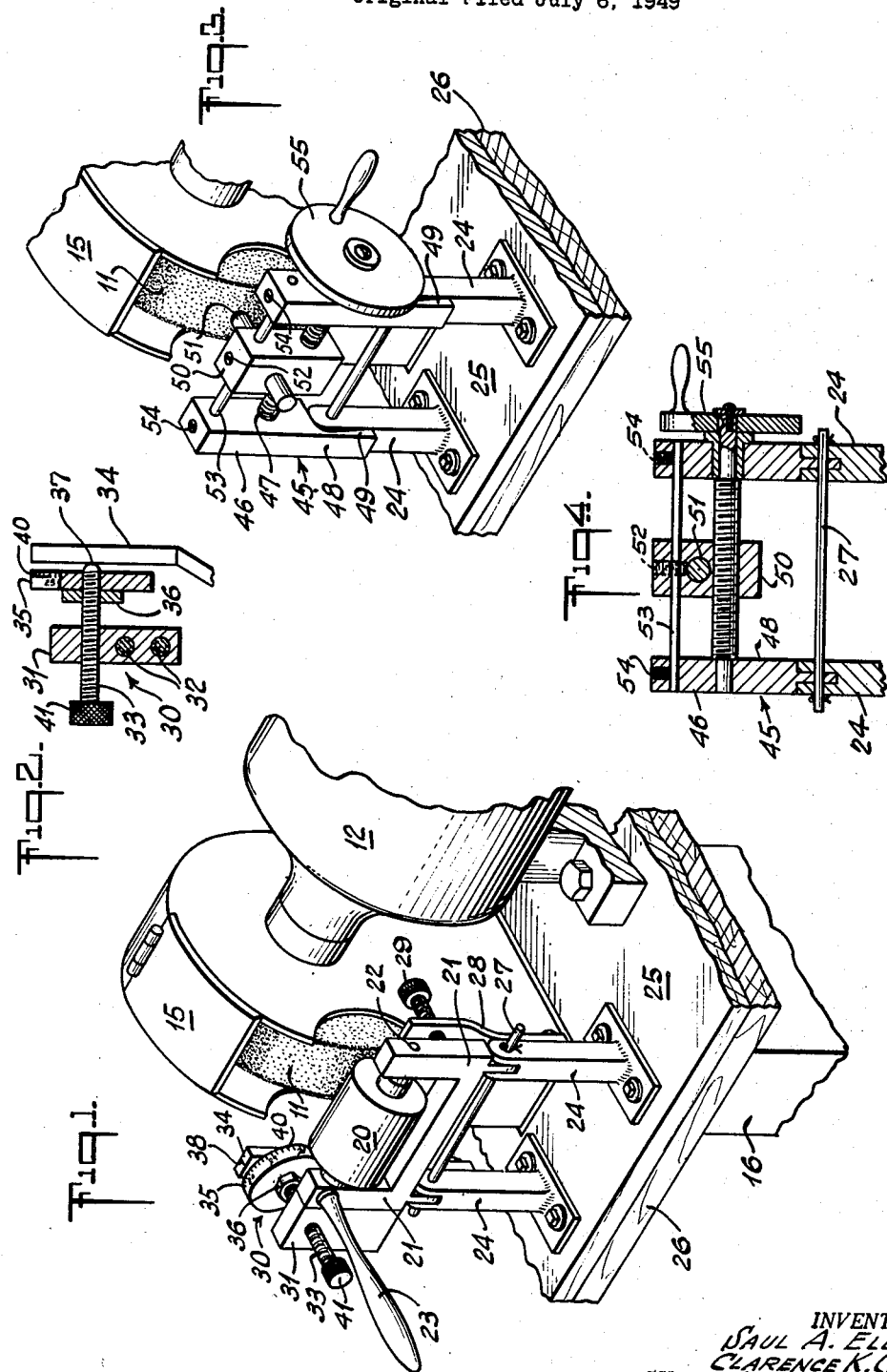
INVENTORS:
SAUL A. ELLER
CLARENCE K. CHATTEN
WILLIAM K. GONDEK
BY
George Sipkin
Lee J. Huntzberger

United States Patent Office 2,708,432
Patented May 17, 1955

2,708,432
WHEEL TRUING DEVICE

Saul A. Eller, New York, and Clarence K. Chatten, Jackson Heights, N. Y., and William K. Gondek, Clifton, N. J.

Original application July 6, 1949, Serial No. 103,282. Divided and this application July 30, 1952, Serial No. 301,812

1 Claim. (Cl. 125—11)

(Granted under Title 35, U. S. Code (1952), sec. 266)

This invention pertains to the art of machining, and it pertains particularly to the art of machining rubber and the like materials that yield under pressure and are subjected to deformation under stress. The invention is embodied in apparatus that is particularly adapted to machine rubber and the like compressible material precisely to accurate dimensions.

In the art of producing samples of rubber or the like materials for comparative tests of various kinds, it is important that the samples be fabricated to dimensions that are accuartely uniform in the several different samples. Applicants encountered this problem in the production of samples of rubber and rubber-like materials in strip form, and accordingly embodied the invention in apparatus for machining rubber and the like materials in sheet or strip form to thicknesses that are accurately determined and maintained uniformly to close tolerances.

For a more complete understanding of the principles of the present invention, and for the disclosure of a machine that embodies these principles, attention is now directed to the accompanying drawings in which:

Fig. 1 is a view in perspective of a machine embodying the present invention,

Fig. 2 is a cross-sectional elevation of a detail of Fig. 1, taken on the lengthwise centerplane of the detail, Fig. 3 is a perspective of an attachment for the machine of Fig. 1, and Fig. 4 is a cross-sectional elevation of the detail of Fig. 3, taken on the lengthwise centerplane of the detail.

The apparatus of the disclosure embodying the present invention comprises a grinding or abrading wheel 11 of any suitable construction, which is preferably driven by the motor 12. A conventional bench grinder is suitable for the purpose. A hood or housing 15 is positioned to enclose the wheel 11 and catch particles of material that are thrown off during the abrading operation. The hood 15 is connected to a duct 16, and any suitable exhaust fan can be connected to the duct 16 to draw off the particles of rubber dust and emery, as also the noxious and unwholesome fumes of rubber, which are generated by the machining operation of the apparatus.

Mechanism is provided to feed the work to the wheel 11. This comprises a work-backing roller or drum 20, and a mounting 21 therefor that positions the roller 20 opposed to the wheel 11 and parallel therewith.

The work-backing roller 20 of the disclosure is of brass or the like suitable material, and it may be solid or hollow, but in any event it is heavy enough to provide sufficient mass for handling the material easily. The roller 20 is mounted to rotate freely on its axis, and is therefore provided with the trunnions 22, which are journalled in the mounting 21.

The roller 20 is adapted to be moved towards and away from the wheel 11, the handle 23 being provided for easy manual operation. The bracket is provided that comprises two upright posts 24 which are attached to the top 25 of the table 26. The pin 27 extends through the posts 24 parallel to the wheel 11, and the mounting 21 is supported to rotate on the axis of pin 27 to swing alternatively towards and away from the wheel 11. The axis of the roller 20 is built in the mounting 21 parallel to the axis of the pin 27.

A limiting stop is provided to prevent the surface of the roller 20 from coming into contact with the surface of the abrasive wheel 11, and to be thereby marred or injured. The lug 28 is attached to the bracket 24, and is provided with a screw 29 that is threaded in the direction towards the mounting 21. The mounting 21 bears against the abutment end of the screw 29, which thereby serves as a limiting stop that holds the roller 21 out of contact with the wheel 11. The screw 29 can be traversed in the lug 28 for adjusting the spacing between the surfaces of roller 21 and wheel 11 to a distance less than the thickness to which it is desired to machine a piece of material.

A machining stop is also provided, illustrated generally at 30. The block 31 is attached to the mounting 21, by means of the cap screws 32 in Fig. 2 for example, and the stop screw 33 is threaded through the block 31. The end 37 of the screw 33 abuts against the lug or abutment arm 34 which is attached to a post 24 of the mounting support bracket to project upwardly from the table 26 in the path of the screw 33.

The dial 35 is threaded onto the stop screw 33 and is held in desired position lengthwise of the screw by means of the locknut 36. The dial 35 is thus positioned at or near the abutment end 37 of the stop screw 33 which bears against the abutment arm 34, the dial thus being located adjacent to the abutment arm. An indicator mark 38 on the arm 34 points to the peripheral scale 40 of the dial 35 and indicates the magnitude of lengthwise movement of screw 33. This is employed to measure the depth of cut by the wheel 11 for machining a sheet of material that rests on the surface of the backing drum or roller 20. The knurled knob 41 of the screw 33 enables its easy manual adjustment. The center of stop screw 33 is located in the block 31 to intersect the axis of the roller 20 on a line through the common radius of the roller 20 and wheel 11. The dial scale 40 thereby provides the linear measurement of the actual movement of the surface of drum 20 towards the surface of wheel 11, the scale 40 being calibrated accordingly for readings in increments of .001".

Apparatus is provided to dress the wheel 11 whenever this is desired or needed, this apparatus being operable to dress the wheel to proper contour and dimensions with reference to its companion work-backing roller 20. The wheel-dressing apparatus, illustrated generally at 45 in Fig. 3 and in detail in Fig. 4, comprises the mounting 46, which is adapted to replace the roller mounting 21 in the machine of the present invention.

The mounting 46 is accordingly adapted to be attached to the posts 24 of the bracket, and it comprises an attachment to hold a dressing tool in position to traverse along the surface of wheel 11. The traverse screw 47 is journalled in the frame members 48, as illustrated in Fig. 4. The frame members 48 include attachments that fit the pin 27 and are located in the mounting 46 to position the traverse screw 47 parallel to pin 27 which is parallel to wheel 11. The frame members 48 include the abutment stops 49 that bear against their respective upright posts 24. The abutment stops 49 operate to limit the amount of permissible rotation of mounting 46 and to hold it opposed to the wheel 11.

The nut 50 is threaded onto the transverse screw 47, and rides along the guide rod 53 when the screw is rotated, the guide rod being secured to the frame members 48 by means of the setscrews 54. The tool 51, which in the disclosed embodiment is a conventional diamond dressing tool, projects through the nut 50 and is adjustably positionable to bear against the surface of wheel 11, the setscrew 52 being operable to hold the tool 51 in its position of adjustment.

The crank 55 is keyed to the traverse screw 47, to enable easy manual rotation of the screw. Rotation of the crank 55 operates to traverse the cutting diamond of the dressing tool 51 along the peripheral face of the abrasive wheel 11, the direction of traverse being parallel to the axis of the wheel. The peripheral face of the wheel 11 is thereby dressed to make it parallel with the surface of the drum 20.

It is preferred practice, whenever the wheel 11 has been dressed and preparatory to machining material, to reset the limiting stop of screw 29 within the desired thickness of the material to be machined, but to hold the surface of the roller 20 away from the wheel 11.

When a piece of compressible material is to be machined, for example rubber or the like flexible and compressible material, the screw 33 is first adjusted to the correct clearance between the roller 20 and wheel 11 for the desired thickness of the material. With the roller 20 retracted, one end of the piece of material is taken in one hand and positioned against the roller 20 with the length of material hanging down over the surface of the roller. The handle 23 is taken in the other hand, and the mounting 21 is rotated on its axis 27 until the abutment end 37 of stop screw 33 bears against the abutment arm 34. Now the material is pulled upwardly manually, whereby it is abraded to the desired thickness. The machine of the disclosure is particularly adapted to machine rubber and the like material in strip form, for the production of test samples for example, and the strips may be of any convenient length.

If the piece of material is irregular on both of opposite surfaces, the smoothest surface is first placed against the drum 20, and the opposite surface is dressed or machined to smoothness by one or more passages through the wheel 11. The strip is then reversed on the drum, and the opposite surface is machined to smoothness in a similar manner, and is passed through the machine as many times as is required to reduce the thickness of the strip to the desired dimension.

Before a strip of material is machined, the stop screw 33 is first set to hold the surface of the drum 20 away from the surface of the wheel 11 a greater distance than the original thickness of the material, and is then adjusted with the strip positioned between the drum and the wheel until the surface of the strip touches the wheel. The screw 33 is then rotated an additional amount for the desired depth of cut, which is measured on the scale 40. The material is now given one or more passages through the wheel 11 for the machining operation, and the screw 33 is again rotated to adjust for another cut. This process is repeated to make successive cuts until the strip of material is machined to the precise thickness desired.

The depth of any cut is determined by reading the adjustment of the screw 33 on the scale 40 of the disc 35. A satisfactory depth of cut is approximately .005". The advisable depth of any cut is determined by the quality of the material, the usual practice being to make the earlier or rough cuts deeper, and to diminish the depth of cut for finishing the surface of the material smoothly when the thickness of the material approaches the desired thickness.

By means of the machine of the present invention, materials that are difficult to machine, and sometimes incapable of being machined by known prior art methods, are able to be machined easily and accurately to precise dimensions. Sleazy fabrics, rubber which is elastic, and other materials which yield under pressure of the wheel 11, may be machined accurately to desired thickness with the degree of accuracy required in test samples of various kinds.

The disclosed structure comprises one practical application of the invention, but is subject to modification without departing from the scope of the invention, which is determined by the accompanying claim.

The invention described herein may be manufactured and used by or for the Government of the United States of America for governmental purposes without the payment of any royalties thereon or therefor.

This application claims an invention disclosed in prior application of Saul A. Eller et al., Serial Number 103,282, filed July 6, 1949, now abandoned, for Machine for Use in Buffing Strip Samples of Rubber Materials.

We claim:

A machine for dressing grinding wheels comprising a table, a motor on said table, a shaft driven by said motor, a support on said table, a mounting member detachably assembled on said support for swinging movement about a pin on said support toward said shaft and away from said shaft, said pin being parallel to said motor-driven shaft, stop means associated with said mounting member and with said support for locking said mounting member in an operative position relative to said shaft, a transverse feed means on said mounting member, a transverse nut on said transverse feed means whereby said transverse feed means is operative to move said transverse nut in a direction parallel to the axis of said shaft, and a dressing tool mounted on said transverse nut, said dressing tool adapted to be adjusted toward or away from said shaft into operative position, whereby said tool is adapted to dress a grinding wheel that is mounted upon said motor driven shaft.

References Cited in the file of this patent

UNITED STATES PATENTS

| 191,400 | Buzzell | May 29, 1877 |
| 242,579 | Andrews et al. | June 7, 1881 |
| 312,272 | Hubbard | Feb. 5, 1885 |

FOREIGN PATENTS

| 573,895 | Germany | Aug. 24, 1930 |